Feb. 24, 1942.  W. D. WRIGHT  2,274,116
OPTICAL SYSTEM
Filed Sept. 22, 1938

INVENTOR
WILLIAM DAVID WRIGHT
BY
ATTORNEY

Patented Feb. 24, 1942

2,274,116

UNITED STATES PATENT OFFICE 2,274,116

OPTICAL SYSTEM

William David Wright, Winchmore Hill, London, England, assignor to Electric & Musical Industries Limited, Hayes, Middlesex, England, a company of Great Britain Application September 22, 1938, Serial No. 231,119
In Great Britain October 1, 1937

3 Claims. (Cl. 178—7.2)

This invention relates to optical systems and has particular but not exclusive reference to optical systems employed for the projection of an image onto an electron emitting surface of an electron discharge device such as a television transmitting tube, an electron telescope or a picture transformer or similar device.

With certain types of electron discharge devices in which an image is projected onto a photosensitive cathode which is arranged to emit an electron image of the optical image, it has been found necessary instead of employing a flat electron-emitting cathode to employ a partially spherical cathode, the electrons being emitted from the concave surface thereof, for the purpose of correcting the curvature of the image which arises when a flat electron emitting surface is used. In most cases the partially spherical cathode hereinafter referred to for the sake of convenience as a "curved cathode" is transparent so as to enable the optical image to be projected onto the convex surface of the cathode.

As the curvature of the cathode has to be considerable, for example, having a radius of 3" with a cathode diameter of 2" and it is desirable to use an optical lens with as large an aperture as possible to form the initial image on the cathode, it will be appreciated that if the optical image is projected onto the convex surface of the curved cathode through a lens system which produces a plane image, only the axial rays will be truly in focus on the curved cathode and the marginal rays will consequently be out of focus thus giving rise to blurring of the image formed on the convex surface of the cathode.

It is the object of the present invention to provide an improved optical system whereby the image of the object transmitted therethrough may be projected onto a convex surface while maintaining the image in focus over substantially the whole of said surface. The range of wave lengths of the radiations employed may exceed that of the visible spectrum and the present invention may be employed with such an extended range of radiations.

According to the invention an optical system is provided comprising a lens system for producing a plane image and a diverging lens is employed in the vicinity of the image plane of said lens system said diverging lens being so constructed that a focussed image will be produced on a concave surface. By the provision of said divergent lens it is possible to project an image through said lens system and the divergent lens to be arranged in the focal plane of said lens system so that an image is eventually produced which is in focus at the concave emergent surface of the divergent lens.

In applying the invention to an electron discharge device having a curved photo-sensitive cathode the divergent lens may be placed in contact with the convex surface of the curved cathode, so that the optical image projected through the curved cathode onto the photo-sensitive surface thereof will be substantially in focus over the whole of its area.

An important feature of the invention consists in arranging that the plane of the exit pupil of the lens system is approximately coincident with the plane perpendicular to the axis of the diverging lens through the centre of curvature of the incident surface of the diverging lens. In this case substantially no unsymmetrical aberrations will be introduced.

In order that the said invention may be clearly understood and readily carried into effect the same will now be more fully described with reference to the accompanying drawing, in which.

Figure 1:
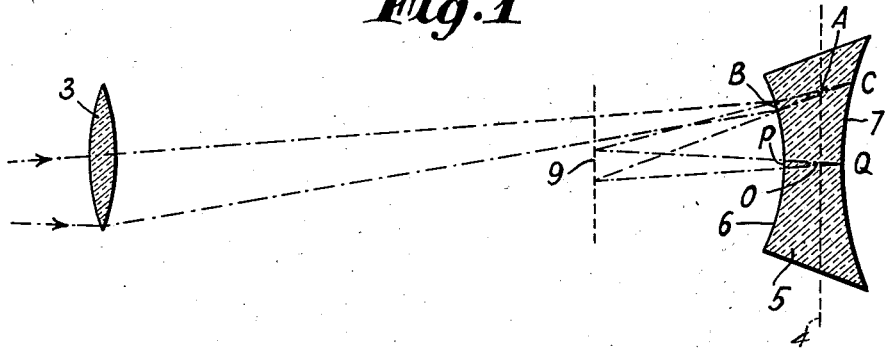
Figure 1 illustrates a lens system in accordance with the invention.
Figure 2:
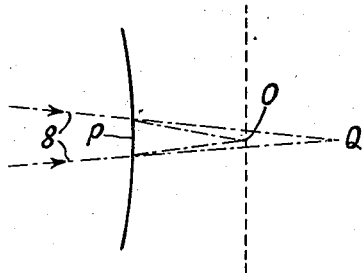
Figure 2 is an explanatory diagram.

As shown in Figure 1, an optical image is projected through a lens 3 which is arranged to produce an image in a flat plane indicated by the dotted line 4. In the vicinity of the focal plane 4 a divergent lens 5 is arranged the rays passing through the lens 3 being incident on the concave surface 6 of the lens 5 where they are refracted by the lens and brought to a focus at the emergent concave surface 7. The effect of the divergent lens is to cause each point of the image to be thrown further over towards the right of the lens shown in Figure 1. In the explanatory diagram shown in Figure 2 the incident rays of a pencil of rays 8 would normally be brought to a focus at O, but owing to the presence of the divergent lens the focussed image is shifted from O to a position Q which, where the refractive index of the material of the lens 5 is 1.5, the distance O to Q=half of the distance OP. Likewise, a marginal ray instead of being brought to a focus at A in Figure 1 will be focussed at C where the distance A to C=half AB where B is the point of incidence of the marginal ray. The resultant image will therefore be on a partially spherical surface the radius of curvature of which to a first approximation corresponds to twice the radius of curvature of the incident surface 6 of the lens 5. For example, assuming that it is desired to project an image onto a curved photo-sensitive cathode having a radius of 3" the incident surface 6 of the lens 5, made of glass of refractive index 1.5, may be of a radius of 1½" whilst the surface 7 may have a radius of 3" and which can thus be placed directly in contact with the surface of the curved photo-sensitive cathode.

In order to avoid the possibility of the lens 5 producing defects in the image it is preferred to arrange that the focal length of the lens 3 is such that the plane of its exit pupil indicated by the dotted line 9 coincides with the plane perpendicular to axis of the lens system through the centre of curvature of the surface 6 of the lens 5. In this case the pencils of rays from the exit pupil will pass substantially normally through the surface 6 and thereby substantially no unsymmetrical aberrations will be introduced. The spherical aberration due to the surface 6 will be negligible owing to the small diameter of the pencils of rays incident on the surface 6, and the chromatic aberration will also be negligible owing to the short distance from the surface 6 at which the rays come to a focus.

It is possible that some so-called "pincushion" distortion will be introduced by the lens 5 and if such distortion is greater than can be tolerated such distortion may be removed in the case where the invention is applied to an electron discharge device by a suitable design of the electrostatic lens usually provided for focussing the photo electrons onto a mosaic or fluorescent screen, or by modification of the scanning coils or plates which are employed where the invention is used in conjunction with a cathode ray television transmitting tube.

As stated above, the invention is of particular use in conjunction with electron discharge devices employing curved cathodes, the electron discharge device either being a television transmitting tube in which the photo electrons emanating from the curved cathode are focussed onto a mosaic screen to produce electrostatic charges therein, the screen being subsequently scanned by a cathode ray beam, or to electron discharge devices which are employed as electron telescopes, picture transformers and the like. If desired, the photo sensitive cathode may be formed directly on the surface 7. The invention is, however, not limited in its application to electron discharge devices.

I claim:

1. An optical system comprising a lens system for producing a plane image and a divergent lens in register with said lens system, said divergent lens having a radius of curvature for the surface facing said lens system smaller than the radius of curvature of the other surface of said divergent lens, said lens system having the plane of its exit pupil conicident with a plane perpendicular to the axis of said divergent lens through the center of curvature of the surface facing said lens system, whereby a sharply focussed image is produced on a curved surface on the side of said other surface of the divergent lens.

2. The combination claimed in claim 1 and having in addition a photo-sensitive cathode lying on said other surface of said divergent lens.

3. The combination claimed in claim 1 and having in addition a curved cathode substantially coincident with said other surface of said divergent lens.

WILLIAM DAVID WRIGHT.